United States Patent
Sung

(10) Patent No.: US 9,981,403 B2
(45) Date of Patent: May 29, 2018

(54) SAFETY FEEDER USABLE WITH DIFFERENT WOODWORKING MACHINES

(71) Applicant: Meng-I Sung, Taichung (TW)

(72) Inventor: Meng-I Sung, Taichung (TW)

(*) Notice: Subject to any disclaimer, the term of this patent is extended or adjusted under 35 U.S.C. 154(b) by 1031 days.

(21) Appl. No.: 14/289,696

(22) Filed: May 29, 2014

(65) Prior Publication Data

US 2014/0360627 A1 Dec. 11, 2014

(30) Foreign Application Priority Data

Jun. 6, 2013 (TW) .............................. 102120104 A

(51) Int. Cl.
*B27B 25/02* (2006.01)
*B23D 47/04* (2006.01)
*B23D 51/04* (2006.01)
*B27B 5/29* (2006.01)

(52) U.S. Cl.
CPC ............ *B27B 25/02* (2013.01); *B23D 47/045* (2013.01); *B23D 51/046* (2013.01); *B27B 5/29* (2013.01)

(58) Field of Classification Search
CPC ......... B27B 25/00; B27B 25/02; B27B 25/08; B27B 25/10; B27B 3/14; B27B 3/16; B27B 5/065; B27B 31/00; B27B 31/003; B23D 47/04; B23D 47/042; B23D 47/045; B23D 47/047; B23D 51/04; B23D 51/043; B23D 51/046; Y10T 83/74; Y10T 83/741; Y10T 83/743; Y10T 83/744; Y10T 83/745; Y10T 83/747; B23Q 7/05; B23Q 7/055

USPC ......... 144/242.1, 246.1, 246.2, 248.2, 248.3, 144/248.4, 248.5, 248.6, 248.7
See application file for complete search history.

(56) References Cited

U.S. PATENT DOCUMENTS

| | | | |
|---|---|---|---|
| 4,212,214 A | 7/1980 | Bippus | |
| 4,483,378 A * | 11/1984 | Chang et al. | .......... B23Q 3/002 144/136.1 |
| 4,528,881 A * | 7/1985 | Harris | .................. B26D 7/0675 144/242.1 |
| 4,875,512 A | 10/1989 | Lin | |
| 4,989,653 A | 2/1991 | Angus | |
| 5,123,464 A | 6/1992 | Van Gelder | |
| 5,247,977 A * | 9/1993 | Munsey et al. | ........... B27L 1/10 144/208.1 |

(Continued)

FOREIGN PATENT DOCUMENTS

| | | |
|---|---|---|
| CN | 2031342 U | 1/1989 |
| CN | 2629934 Y | 8/2004 |

(Continued)

*Primary Examiner* — Matthew G Katcoff
(74) *Attorney, Agent, or Firm* — Alan D. Kamrath; Kamrath IP Lawfirm, P.A.

(57) ABSTRACT

A safety feeder usable with different woodworking machines includes a fixing frame releasably mountable on a woodworking machine. A device connects to the fixing frame. The fixing frame cranes the device. The device includes a drive device, a transmission system, and at least one first and second pressing rollers. The drive device engages with and is able to drive the at least one first and second pressing rollers through the transmission system. The transmission system includes an axle engaging with the at least one first and second pressing rollers. The at least one first and second pressing rollers are disposed separately in an axial direction with a predetermined gap on the axle.

19 Claims, 14 Drawing Sheets

(56) References Cited

U.S. PATENT DOCUMENTS

| | | | |
|---|---|---|---|
| 5,904,192 A * | 5/1999 | Chen | B27C 1/04 144/114.1 |
| 7,730,914 B2 | 6/2010 | Lin | |
| 8,371,198 B2 * | 2/2013 | Babine | B27B 25/02 83/441.1 |
| 8,931,528 B2 * | 1/2015 | Hsiung | B27B 25/10 144/242.1 |
| 2009/0049969 A1 | 2/2009 | Lin | |
| 2014/0360627 A1 | 12/2014 | Sung | |

FOREIGN PATENT DOCUMENTS

| | | |
|---|---|---|
| CN | 2754844 Y | 2/2006 |
| CN | 201168988 Y | 12/2008 |
| CN | 202045691 U | 11/2011 |
| DE | 3423630 A1 | 1/1986 |
| DE | 3708341 A1 | 9/1988 |
| JP | S55112746 A | 8/1980 |
| JP | H07223202 A | 8/1995 |
| SU | 721328 A1 | 3/1980 |
| TW | 243747 | 3/1995 |
| TW | 392571 U | 6/2000 |

* cited by examiner

SAFETY FEEDER USABLE WITH DIFFERENT WOODWORKING MACHINES

BACKGROUND OF THE INVENTION

1. Field of the Invention

The present invention relates to a feeder and, particularly to a feeder with two pressing rollers set apart and usable with different woodworking machines.

2. Description of the Related Art

There are various types of woodworking machines nowadays. Planning and sawing are basic woodworking operations. Upon a planning operation, a wood workpiece can be planed to include a groove having a planer or a special shape. Upon a sawing operation, the wood workpiece can be sawed to include a special shape. There are specific woodworking machines for different characteristics of planning operations. In addition, a feeder would be fit to a woodworking machine to feed the wood workpiece into the woodworking machine, but, it is noted that ways of feeding the wood workpiece are different with respect to different processing methods of the wood workpiece, because cutters have specific shapes and specific feeders have to be used in order to feed the wood workpiece stably and safely. However, a lot of money is needed for designing different feeders for different woodworking machines.

FIG. 14 shows a feeder fit to a woodworking machine. The feeder is disposed above a platform of a woodworking machine. The feeder includes a row of pressing rollers. There are three pressing rollers. When the feeder is feeding a wood workpiece, the feeder includes the pressing rollers disposed on one side of a cutter of the woodworking machine, pressing the wood workpiece against the platform, and conveying the wood workpiece, however, this conventional feeder is only able to press against a half of the wood workpiece and is unable to press against the other half. Therefore, the half of the wood workpiece that is not pressed by the feeder rollers is not pushed by the feeder rollers and needs an exterior force to overcome frictions associated with the other half of the wood workpiece, the platform, and a fence of the woodworking machine it abuts against in order to move simultaneously with the other half of the wood workpiece. Generally, a user manually exerts a force to push the wood workpieces. However, it could be hazardous. It is noted that if the halves of the wood workpiece are not moved simultaneously, the cutter can not stably cut the wood workpiece and produce an accurate cut.

The present invention is, therefore, intended to obviate or at least alleviate the problems encountered in the prior art.

SUMMARY OF THE INVENTION

According to the present invention, a safety feeder usable with different woodworking machines includes a fixing frame releasably mountable on a woodworking machine. A device connects to the fixing frame. The fixing frame cranes the device. The device includes a drive system, a transmission system, and at least one first pressing roller and at least one second pressing roller. The drive device engages with and is able to drive the at least one first pressing roller and the at least one second pressing roller through the transmission system. The transmission system includes an axle engaging with the at least one first pressing roller and the at least one second pressing roller. The at least one first pressing roller and the at least one second pressing roller are disposed separately in an axial direction with a predetermined gap on the axle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a safety feeder usable with a woodworking machine.

It is another object of the present invention to provide a feeder usable with different woodworking machines.

It is a further object of the present invention to provide a feeder allowing a wood workpiece to be cut precisely.

Other objects, advantages, and new features of the present invention will become apparent from the following detailed description of the invention when considered in conjunction with the accompanied drawings.

DETAILED DESCRIPTION OF THE INVENTION

Figure 1:
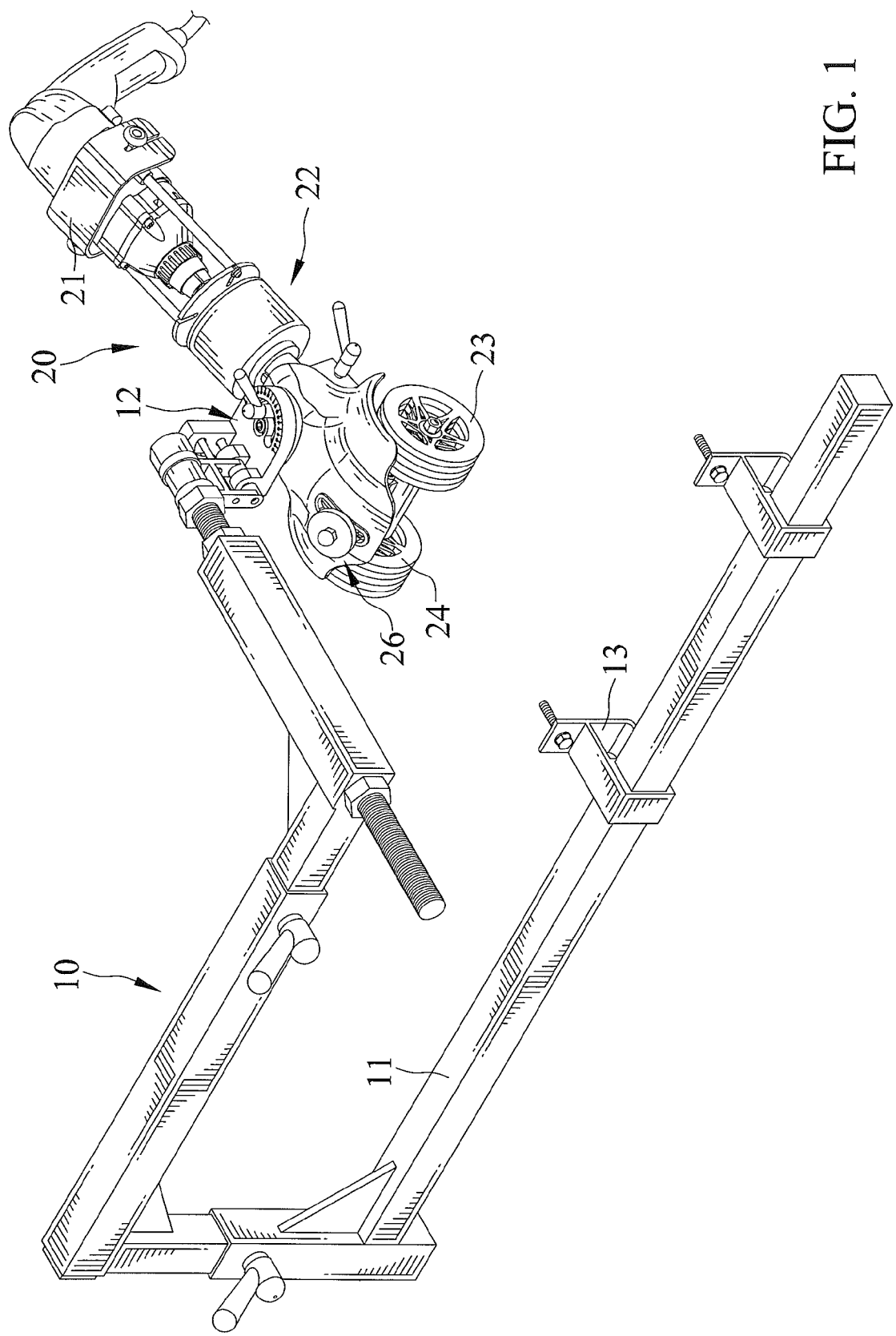
FIG. 1 is a perspective view of a safety feeder usable with different woodworking machines in accordance with the present invention.
Figure 2:
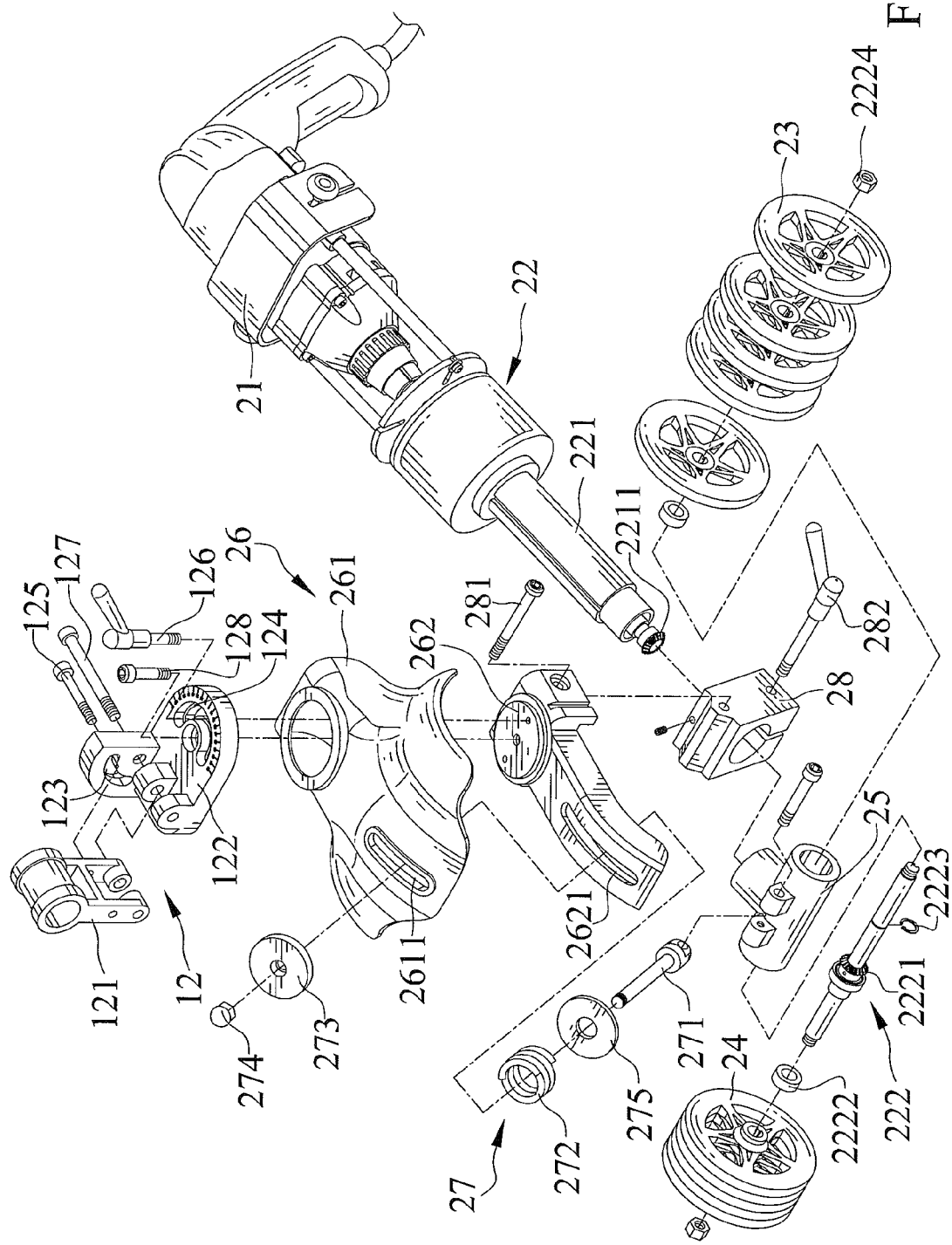
FIG. 2 is a partial, exploded perspective view of the safety feeder of the present invention.
Figure 3:
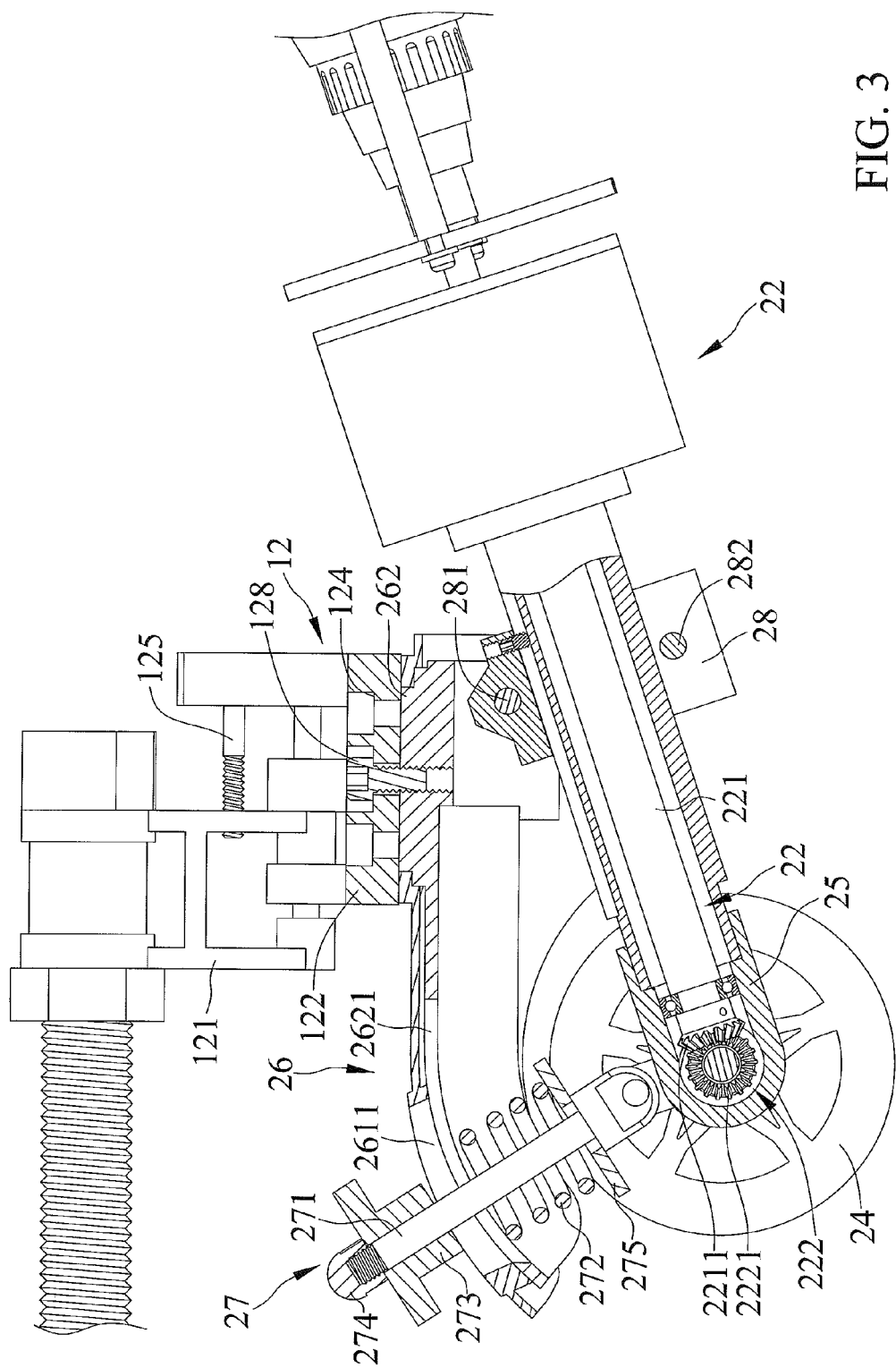
FIG. 3 is a partial, cross-sectional view of the safety feeder of the present invention.
Figure 4:
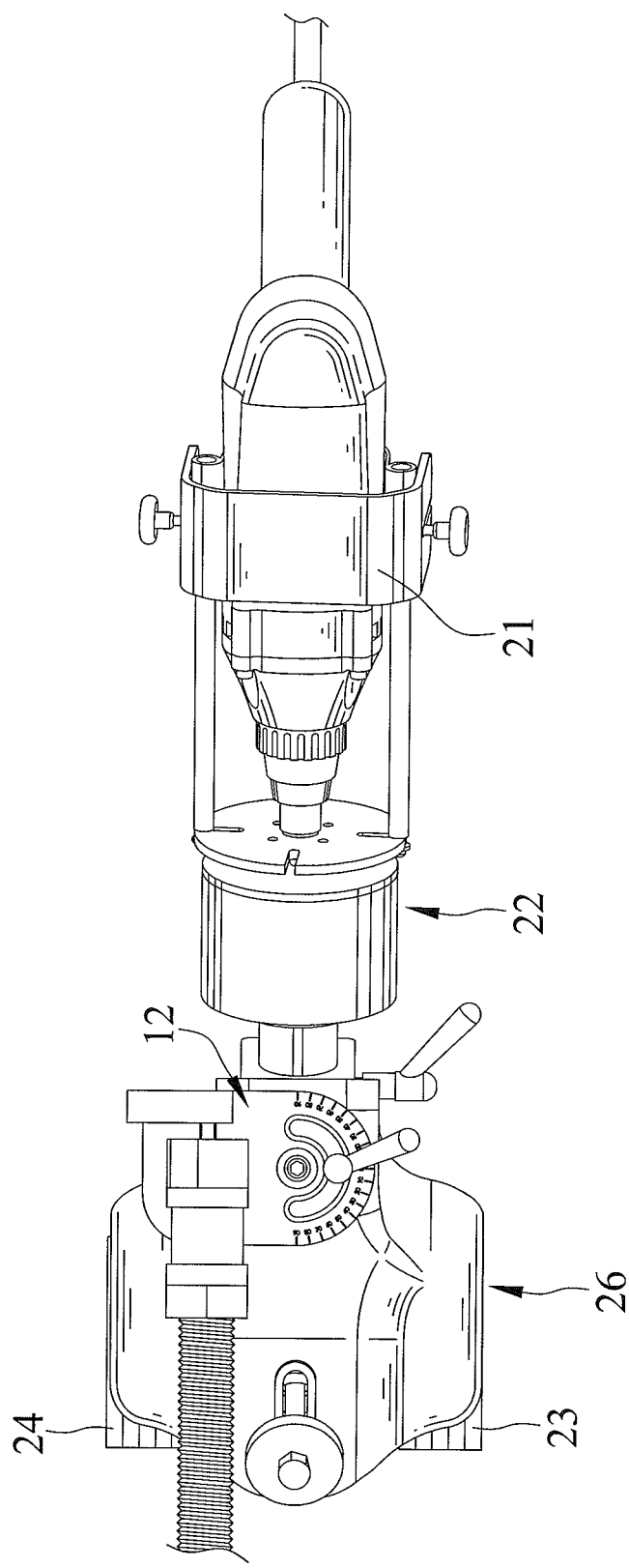
FIG. 4 is a partial, top view of the safety feeder of the present invention, with the feeder set to a first orientation.
Figure 5:
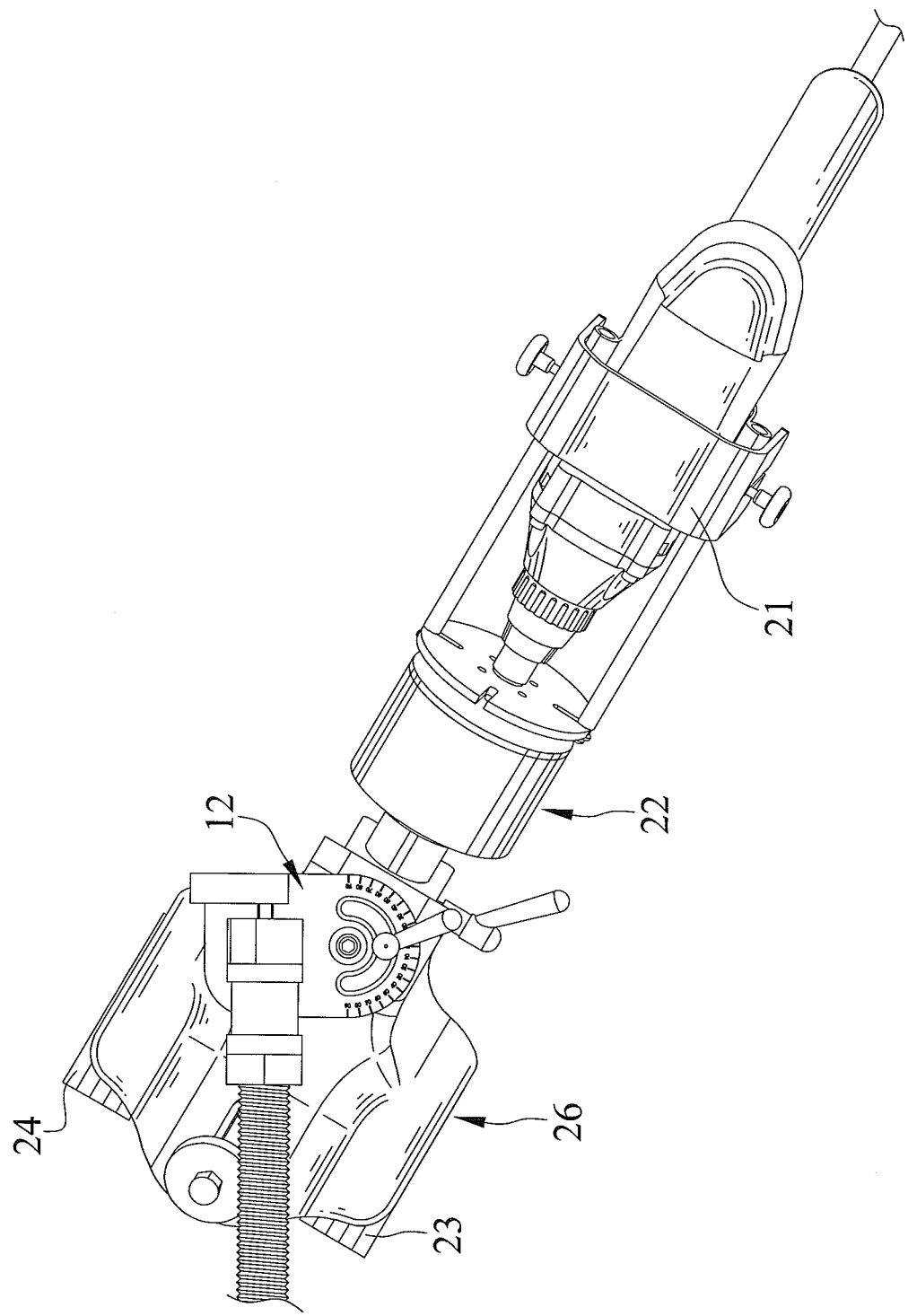
FIG. 5 is similar to FIG. 4, except that the feeder is set to a second orientation different from the first orientation.
Figure 6:
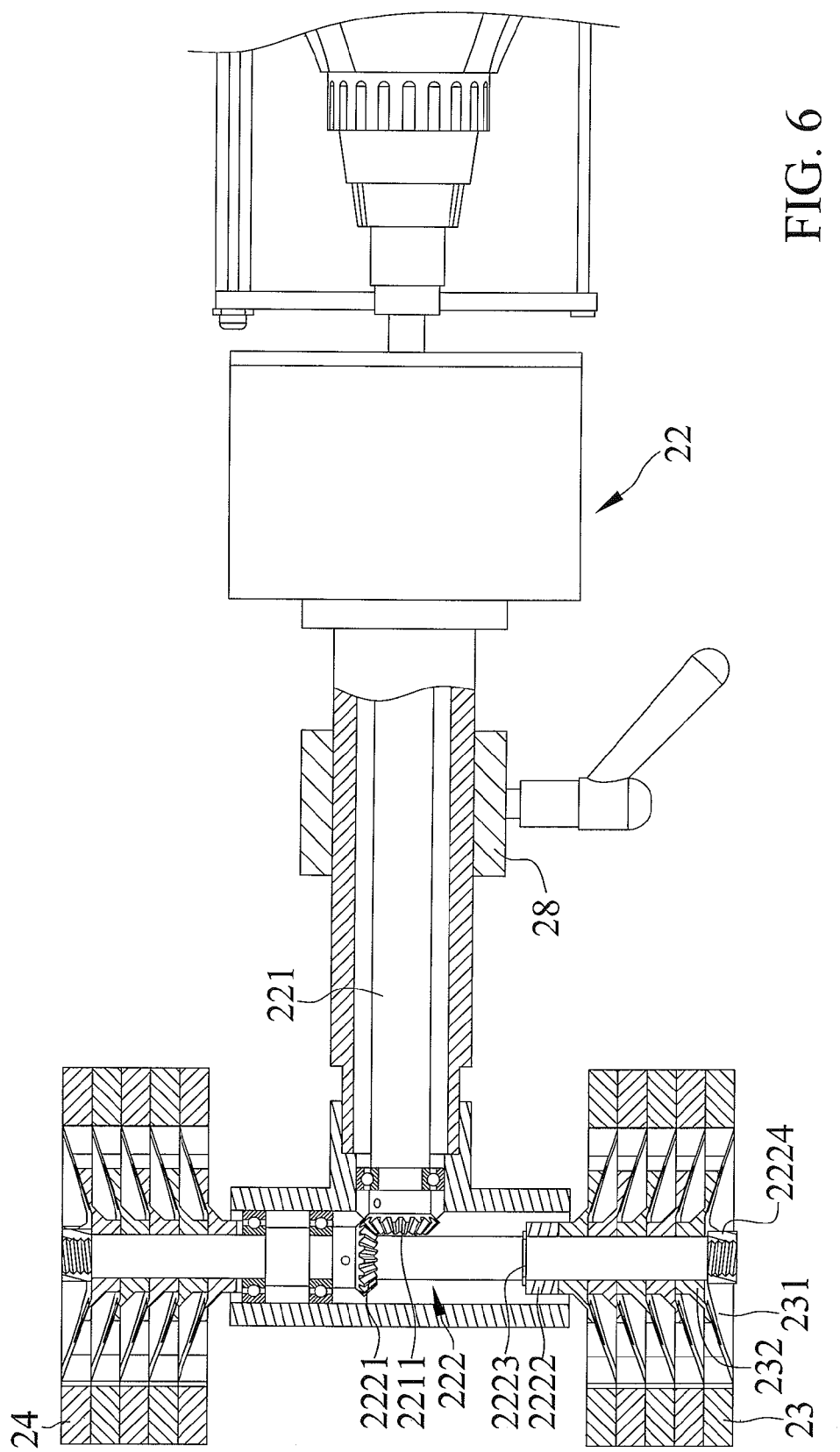
FIG. 6 is a partial, cross-sectional view of a transmission and rollers of the feeder of the present invention.
Figure 7:
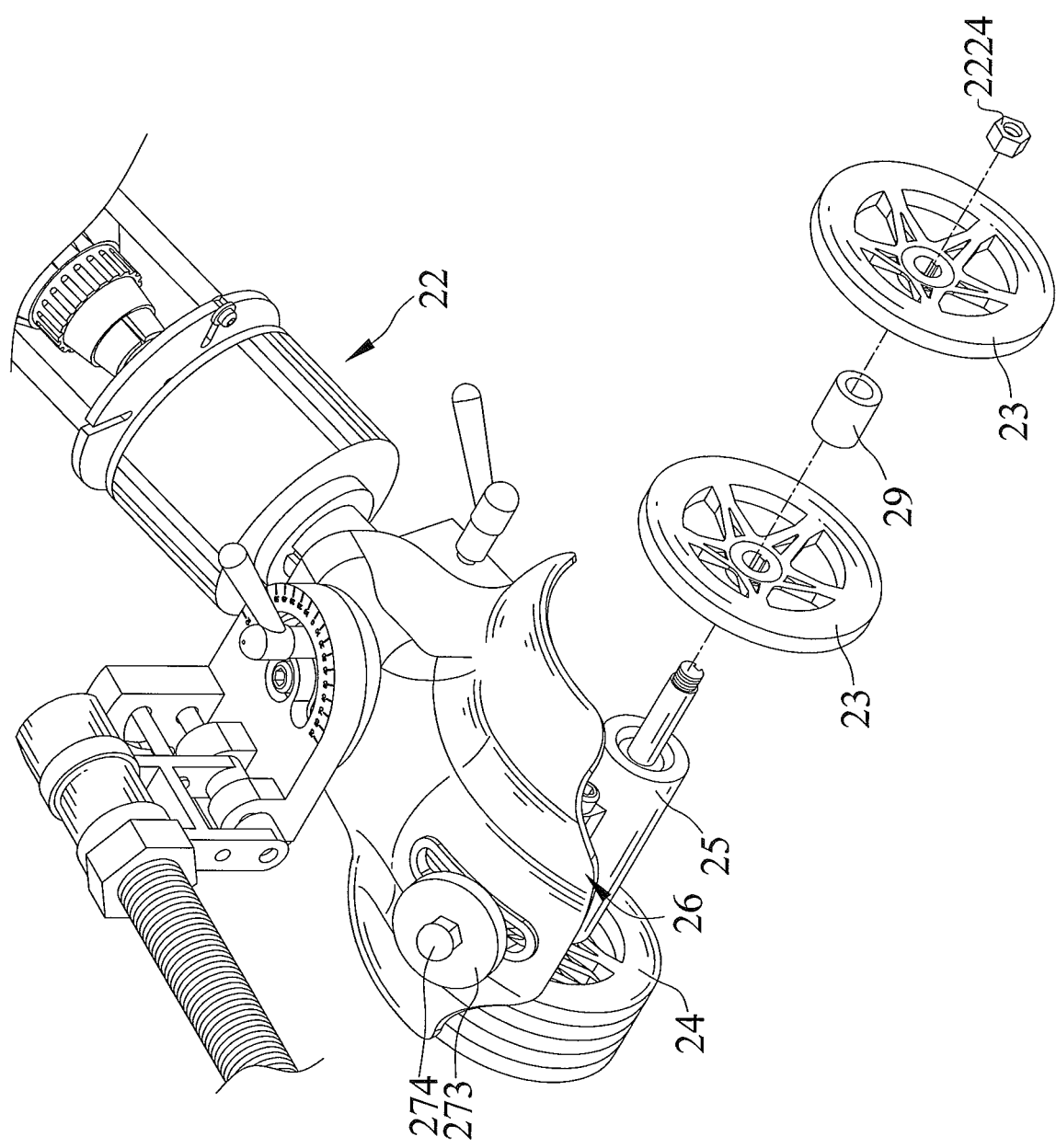
FIG. 7 is an exploded perspective view showing the rollers in an arrangement different from that of FIG. 6, with two rollers separating from each other and including a spacer disposed therebetween.
Figure 8:
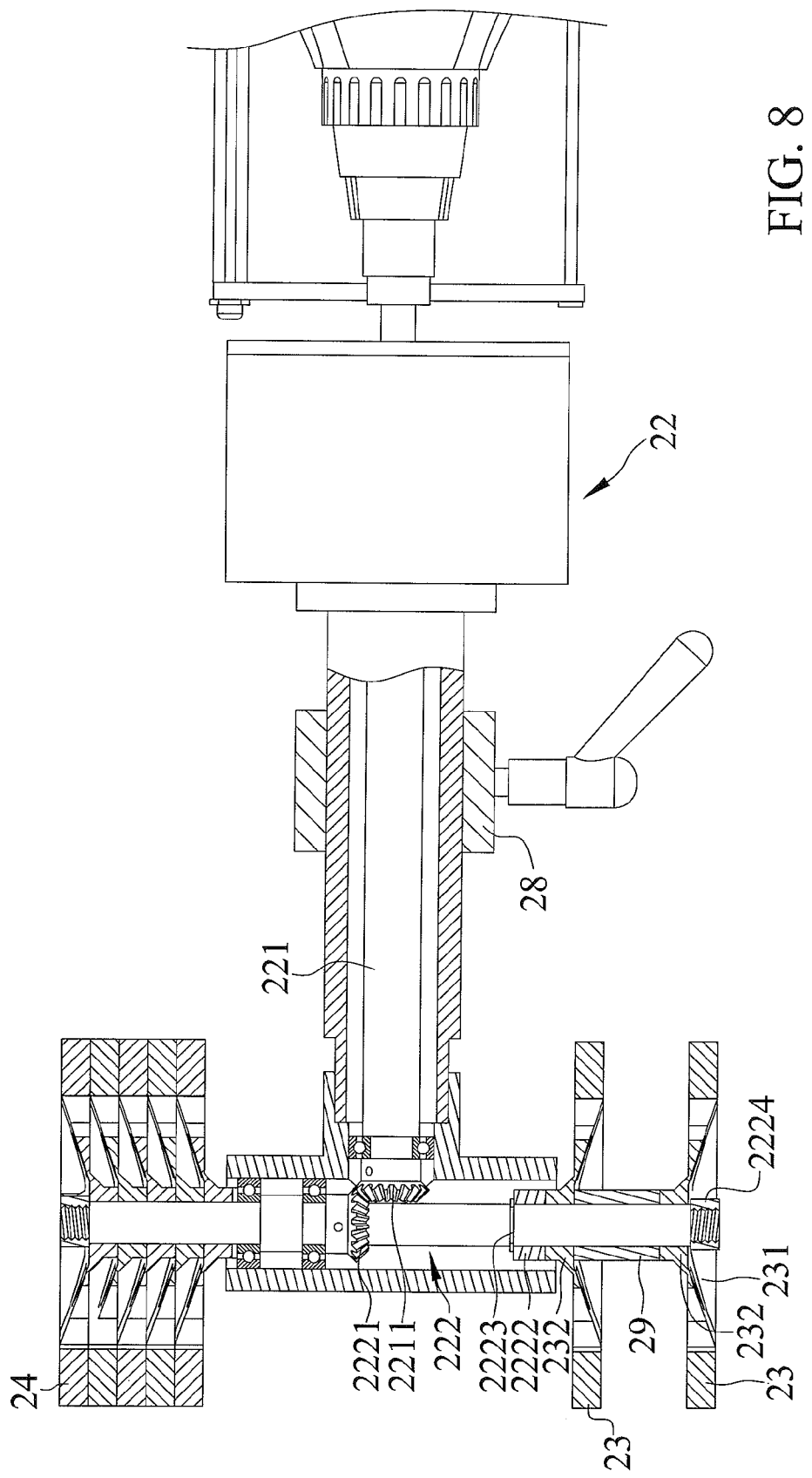
FIG. 8 is a partial, cross-sectional view of FIG. 7.
Figure 9:
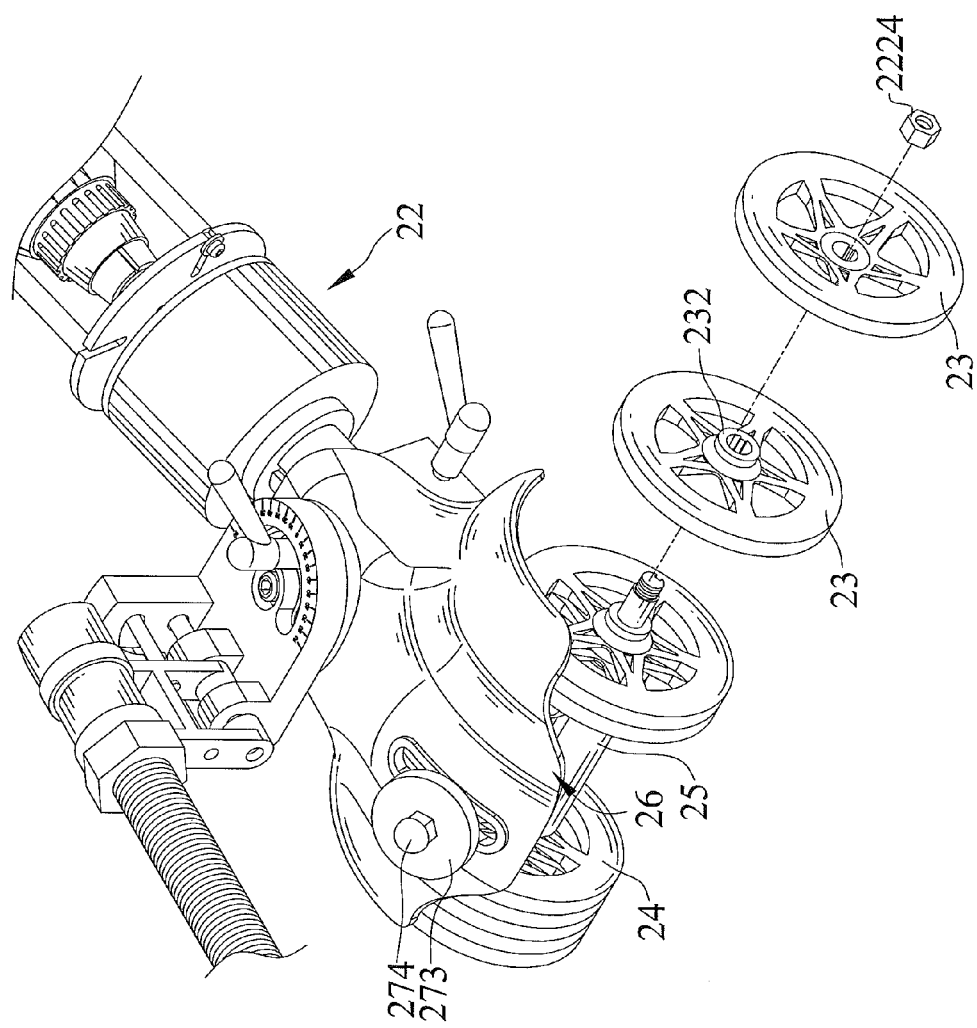
FIG. 9 is an exploded perspective view showing the roller in another arrangement different from that of FIG. 7, with two rollers separating from each other.
Figure 10:
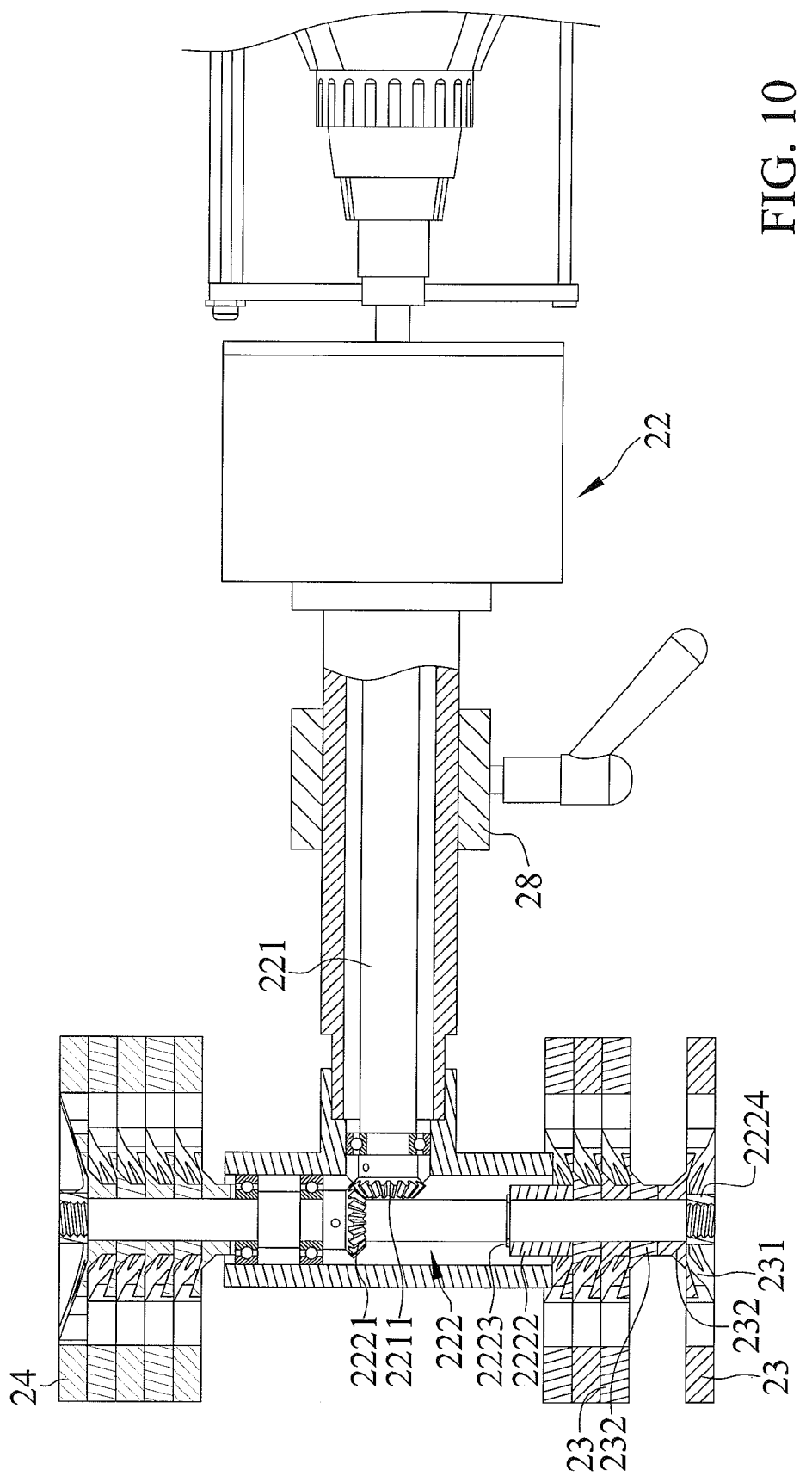
FIG. 10 is a partial, cross-sectional view of FIG. 9.

FIGS. 1 through 13 show a safety feeder usable with different woodworking machines in accordance with the present invention. The feeder includes a fixing frame 10 releasably mountable on a woodworking machine. A device 20 connects to the fixing frame 10.

The fixing frame 10 cranes the device 20. The fixing frame 10 includes a plurality of beams 11 telescopically connected with each other. The fixing frame 11 includes one of the plurality of beams 11 securing to the woodworking machine. In the embodiment, the one of the plurality of beams 11 that secures to the woodworking machine are suspended by at least one bracket 13. The at least one bracket 13 is fixable to the woodworking machine. The fixing frame 10 includes another two of the plurality of beams 11 telescopically connected with and movable relative to each other in a first direction that affects a vertical position of the device 20 with respect to the woodworking machine. The fixing frame 10 includes another two of the plurality of beams 11 telescopically connected with and movable relative to each other in a second direction that affects a horizontal position of the device 20 with respect to the woodworking machine. The device 20 is pivotally positionable with respect to the fixing frame 10. The fixing frame 10 and device 20 include a pivot joint 12 connecting therewith. The pivot joint 12 includes a first pivot joint 121 pivotally engaging with the fixing frame 10 and a second pivot joint 122 pivotally engaging with the device 20 and includes the first and second pivot joints 121 and 122 pivotally engaging with each other. A first pivot 127 engages with the first and second pivot joints 121 and 122. A second pivot 128 engages with the second pivot joint 122 and the device 20. The first pivot joint 121 pivots with respect to the fixing frame 10 in a first orientation. The second pivot joint 122 pivots with respect to the first pivot joint 121 in the first orientation. The device 20 pivots with respect to the second pivot joint 122 in a second orientation. The pivot joint 12 includes first and second slots 123 and 124, a first locking member 125 engaging with the first and second pivot joint 121 and 122 by inserting through the first slot 123, and a second locking member 126 engaging with the second pivot joint 122 and the device 20 by inserting through the second slot 124. The first and second slots 123 and 124 define two arcuate slots. The first locking member 125 has a lock position in which the first and second pivot joints 121 and 122 are at a fixed relative pivoting position and an unlock position in which the first and second pivot joints 121 and 122 are pivotal relative to each other. The second locking member 126 has a lock position in which the second pivot joint 122 and the device 20 are at a fixed relative position and an unlock position in which the second pivot joint 122 and the device 20 are pivotal relative to each other. The pivot joint 12 has two scales, with one scale indicating a pivoting position of the second pivot joint 122 with respect to the first pivot joint 121, and with the other scale indicating a pivoting position of the device 20 with respect to the second pivot joint 122.

The device 20 includes a drive system 21, a transmission system 22, and at least one first and at least one second pressing rollers 23 and 24. The drive system 21 engages with and is able to drive the at least one first and second the at least one pressing rollers 23 and 24 through the transmission system 22. The drive system 21 can be a power tool as shown in the drawings, a pneumatic tool, or a motor, but not limiting. The transmission system 22 includes a shaft 221 and an axle 222 engaging with the shaft 221. The shaft 221 interconnects the drive system 21 and the axle 222. The drive system 21 drives the shaft 221. The drive system 21 turns the shaft 221. The shaft 221 drives the axle 222. The shaft 221 turns the axle 222. The shaft and the axle 221 and 222 are arranged perpendicularly to each other. The shaft 221 includes a first bevel gear 2211 and the axle 222 includes a second bevel gear 2221 engaging with the first bevel gear 2211. The axle 222 engages with the at least one first and the at least one second pressing rollers 23 and 24. One of the at least one first and the at least one second pressing rollers 23 and 24 and the second bevel gear 2221 include a spacing member 2222 and a first restraining members 2223 disposed therebetween. The axle 222 engages with the spacing member 2222 and the first restraining member 2223. The spacing member 2222 is disposed between the first restraining member 2223 and one of the at least one first and the at least one second pressing rollers 23 and 24. A second restraining member 2224 engages with the axle 222. The first and second restraining member 2223 and 2224 limit axial movement of the spacing member 2222 and one of the at least one first and the at least one second pressing rollers 23 and 24 on the axle 222. The axle 222 drives the at least one first and the at least one second pressing rollers 23 and 24. The axle 222 turns the at least one first and the at least one second pressing rollers 23 and 24. The at least one first and the at least one second pressing rollers 23 and 24 are disposed on two different ends of the axle 222. The at least one first and the at least one second pressing rollers 23 and 24 are disposed separately in an axial direction with a predetermined gap on the axle 222. The at least one first and the at least one second pressing rollers 23 and 24 are of the same configuration. The second bevel gear 2221 is in between the at least one first and the at least one second pressing rollers 23 and 24. A sleeve 25 receives the shaft 221 and the axle 222. The sleeve includes a first sleeve section delimiting a first area receiving the shaft 221 and a second sleeve section delimiting a second area receiving the axle 222 respectively. The first and second areas are connected and in communication with each other. The sleeve 25 is T shaped, with the first and second sleeve sections extending perpendicularly to each other. The first sleeve section extends from an outer circumferential periphery of the second sleeve section. The device 20 includes a body shell 26 that frames the at least one first and the at least one second pressing rollers 23 and 24. The body shell 26 and the pivot joint 12 pivotally engage with each other. The body shell 26 includes a first body shell 261 and a second body shell 262 engaging with and disposed under the first body shell 261. The second pivot 128 inserts through the first body shell 261 and engages with the second body shell 262. The first and second body shells 261 are made separately, but not limiting. The body shell 26 includes a groove extending therethrough. The groove includes a first groove 2611 and a second groove 2621. The first and second grooves 2611 and 2621 are elongated. The first and second grooves 2611 and 2621 are disposed correspondingly to each other. The first and second grooves 2611 and 2621 and the shaft 221 extend in the same axial direction. The first groove 2611 extends on and through the first body shell 261. The second groove 2621 extends on and through the second body shell 262. A suspension system 27 interconnects the body shell 26 and the axle 222. The suspension system 27 includes a strut 271, a biasing member 272, a retainer 273, a securing member 274, and at least one gasket 275. The strut 271 has a first end pivotally connecting to the axle 222 and a second end inserting through the groove. The strut 271 extends through the first and second grooves 2611 and 2621. The strut 271 includes the first end fixing to the sleeve 25. The biasing member 272 is restrained on the strut 271. The biasing member 272 is a coil spring. The biasing member 272 is disposed between the body shell 26 and the sleeve 25. The biasing member 272 is disposed between the body shell 26 and the axle 222. The retainer 273 connects to the second end of the strut 271 and supported by the body shell 26. The retainer 273 is slidable on the body shell 26. The retainer 273 slides on the body shell 26 when the strut 271 pivots. The strut 271 inserts through and restrains the at least one gasket 275. The biasing member 272 is disposed between the body shell 26 and the gasket 275. A constrainer 28 constrains the transmission system 22 and the suspension system 27. The constrainer 28 connects to the transmission system 22 and the body shell 26. The constrainer 28 pivotally engages with the body shell 26. The constrainer 28 includes a through hole and the shaft 221 of the transmission system 22 inserts through the through hole. A fastener 282 inserts into the constrainer 28. The constrainer 28 is pivotal about a pivot 281 with respect to the body shell 26. The pivot 281 inserts into the constrainer 28 and is secured to the body shell 26. In this embodiment, the pivot 281 is secured to the second body shell 262 of the body shell 26. The constrainer 28 is restricted from rotating with respect to the shaft 221.

Each of the at least one first and the at least one second pressing roller 23 and 24 has a hub with a first side forming a recess 231 and a second side opposite to the first side forming a protrusion 232. The at least one first pressing roller 23 includes a plurality of first pressing rollers 23 engaging with the axle 222. Adjacent two of the plurality of first pressing rollers 23 have two arrangements, with the adjacent two of the plurality of first pressing rollers 23 overlapping together without a gap and having circumferential edges combined and adjacent to each other in a first arrangement, and with the adjacent two of the plurality of first pressing rollers 23 overlapping together with a gap and having the circumferential edges separated with the gap in a second arrangement. Two adjacent of plurality of first pressing rollers 23 in the first arrangement include one protrusion 232 engaging in one recess 231. The two adjacent of the plurality of first pressing rollers 23 in the second arrangement include the protrusions facing oppositely and abutting against each other. The two adjacent of the plurality of first pressing rollers 23 in the second arrangement include a spacer disposed therebetween or the protrusions facing oppositely. The spacer engages with the axle 222. The two adjacent of the plurality of first pressing rollers 23 in the second arrangement include the protrusions facing in the same direction.

Figure 11:
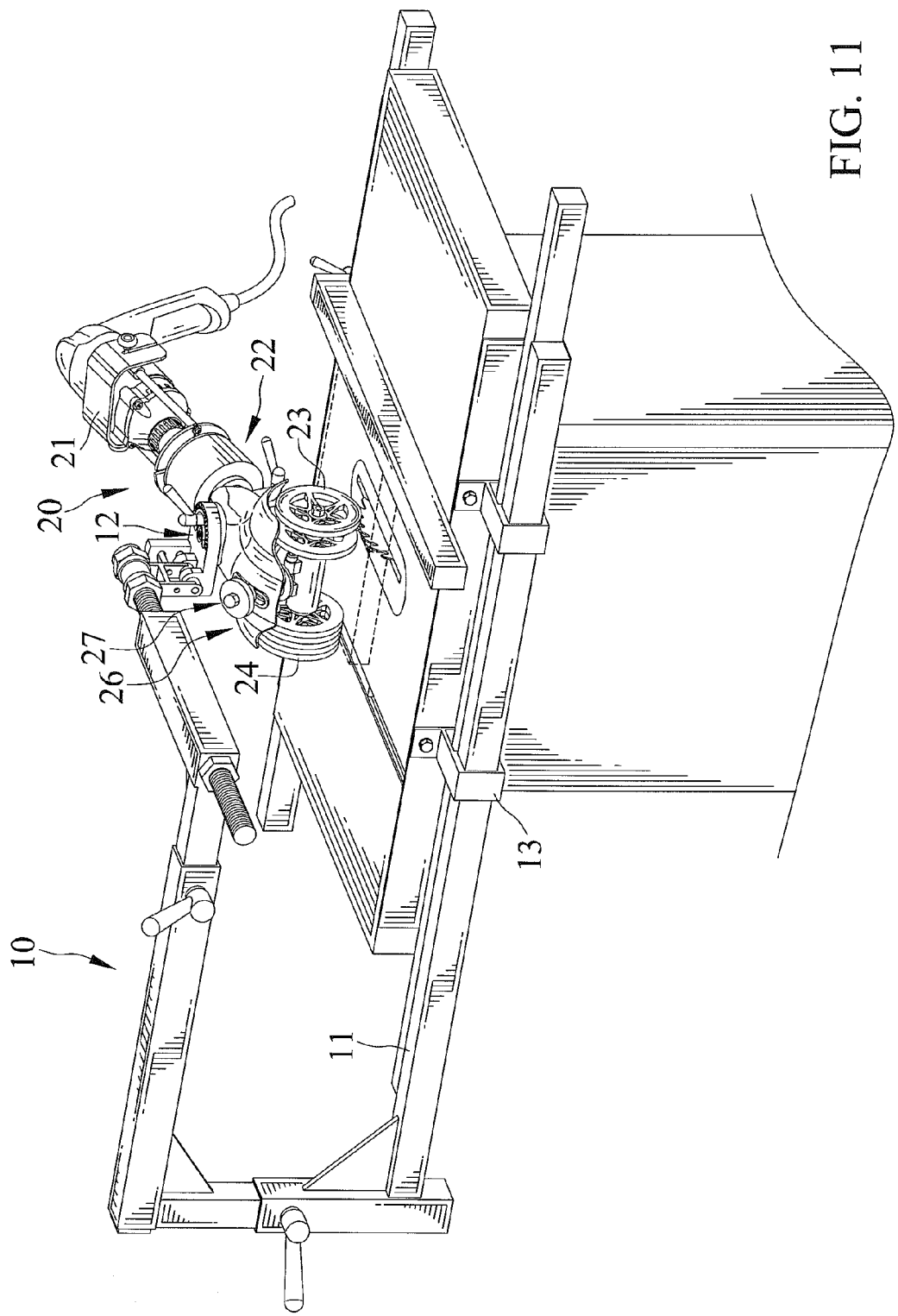
FIG. 11 is a perspective view of the feeder of the present invention and a circular saw machine, with the feeder feeding a wood workpiece to be processed by the circular saw machine.
Figure 12:
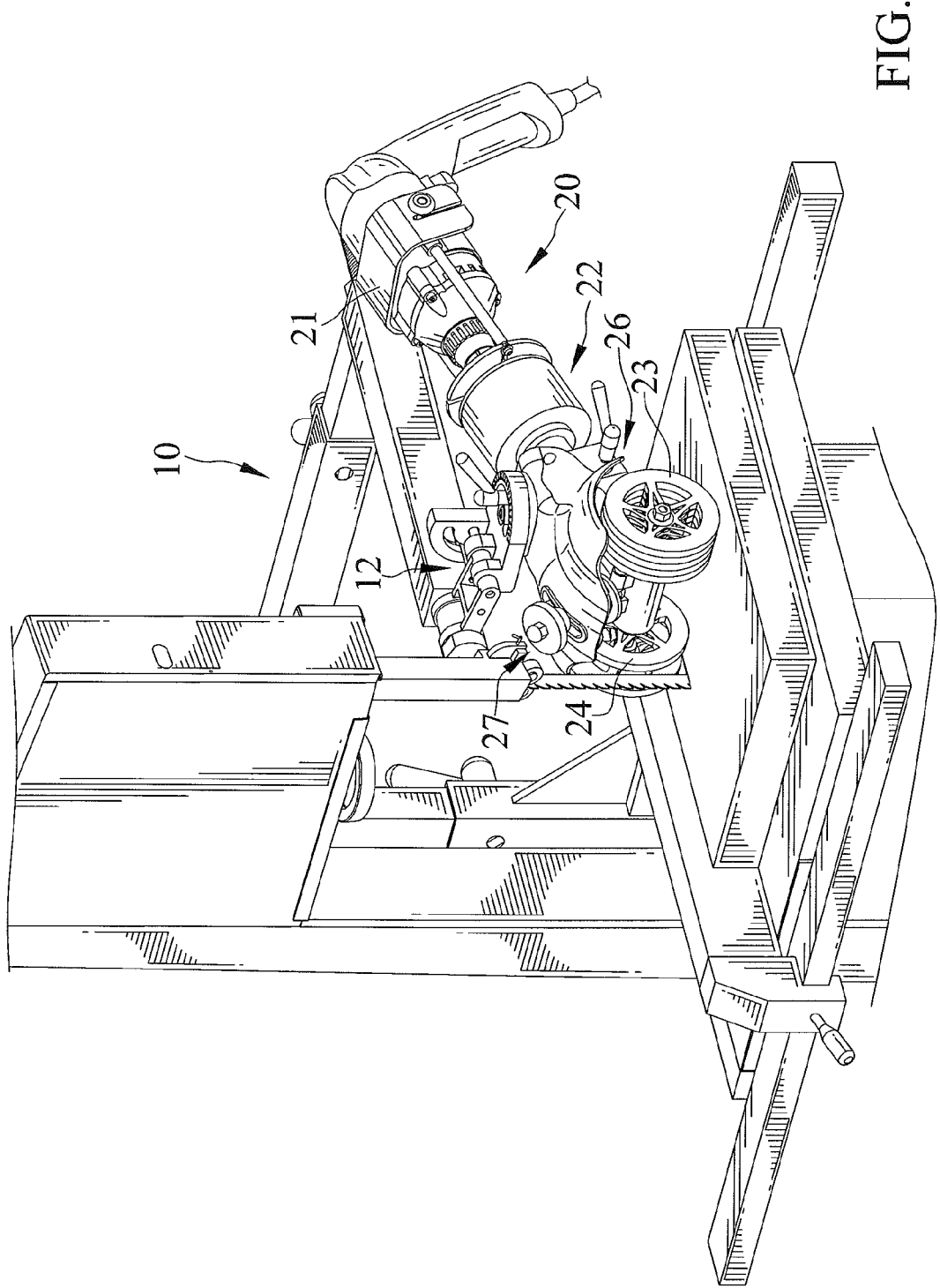
FIG. 12 is a perspective view of the feeder of the present invention and a band saw machine, with the feeder feeding a wood workpiece to be processed by the band saw machine.

Because the adjacent two of the plurality of the first pressing rollers 23 in the second arrangement include the gap therebetween, a cutter of the woodworking machine can align between the adjacent two of the plurality of the first pressing rollers 23. Therefore, the cutter can cut the wood workpiece between the adjacent two of the plurality of the first pressing rollers 23, and one half of the wood workpiece is pressed and pushed by one of the adjacent two first pressing rollers 23 and the other half of the wood workpiece is pressed and pushed by the other of the adjacent two first pressing rollers 23, respectively, as shown in FIGS. 11 and 12. The at least one second pressing roller 24 includes a plurality of second pressing rollers 24 engaging with the axle 222. Adjacent two of the plurality of second pressing rollers 24 have two arrangements, with the adjacent two of the plurality of second pressing rollers 24 overlapping together without a gap and having circumferential edges combined and adjacent to each other in a first arrangement, and with the adjacent two of the plurality of second pressing rollers 24 overlapping together with a gap and having the circumferential edges separated with the gap in a second arrangement.

Because the adjacent two of the plurality of the second pressing rollers 24 in the second arrangement include the gap therebetween, a cutter of the woodworking machine can align between the adjacent two of the plurality of the second pressing rollers 24. Therefore, the cutter can cut the wood workpiece between the adjacent two of the of the plurality of the second pressing rollers 24, and one half of the wood workpiece is pressed and pushed by one of the adjacent two second pressing rollers 24 and the other half of the wood workpiece is pressed and pushed by the other of the adjacent two second pressing rollers 24, respectively.

When using the feeder to feed a wood workpiece to the woodworking machine, the at least one first and the at least one second pressing rollers 23 and 24 press the wood workpiece against a platform of the woodworking machine and conveying the wood workpiece. The at least one first and the at least one second pressing rollers 23 and 24 turn in the same direction.

Figure 13:
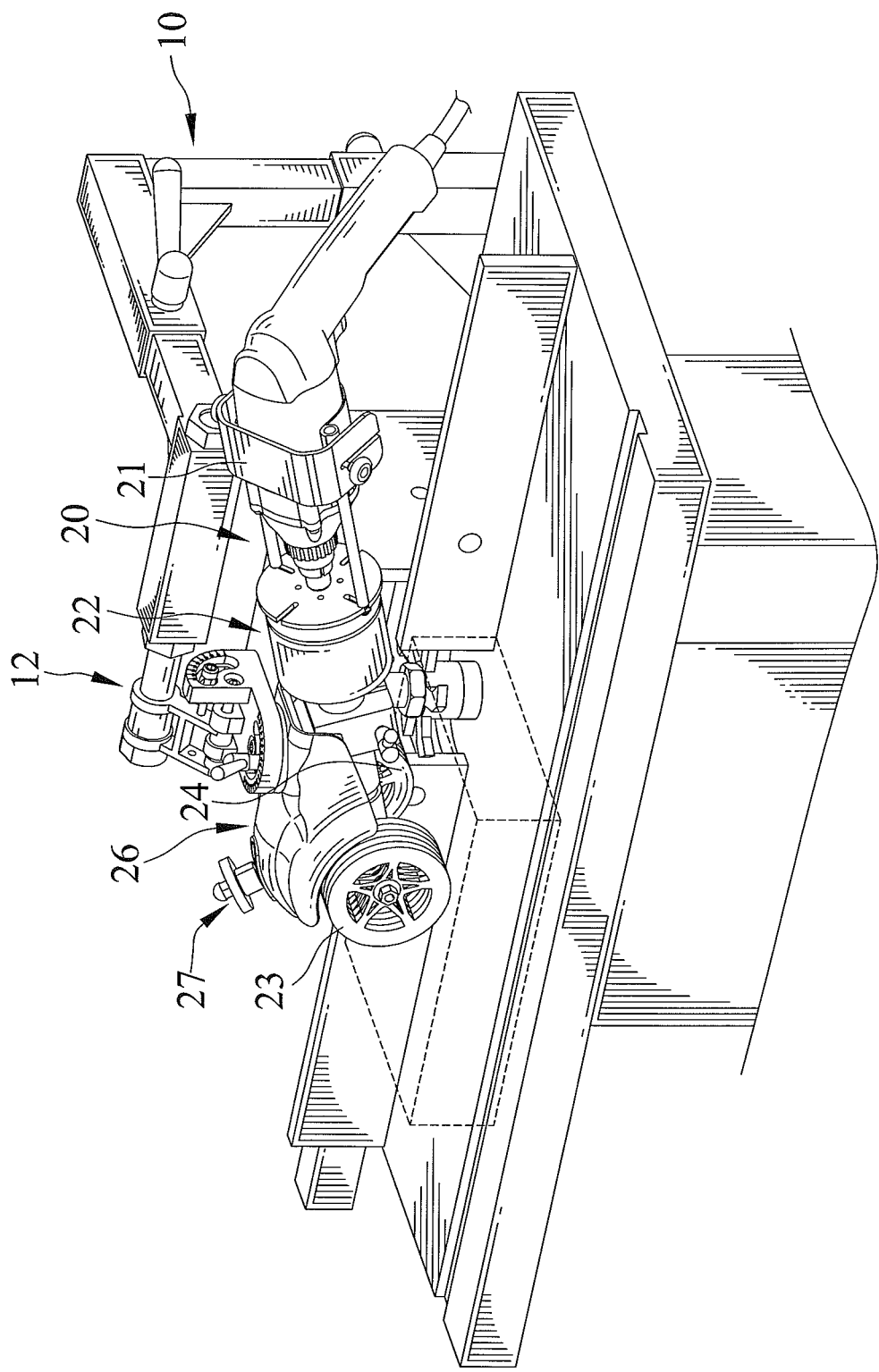
FIG. 13 is a perspective view of the feeder of the present invention and a wood shaper, with the feeder feeding a wood workpiece to be processed by the wood shaper.
Figure 14:
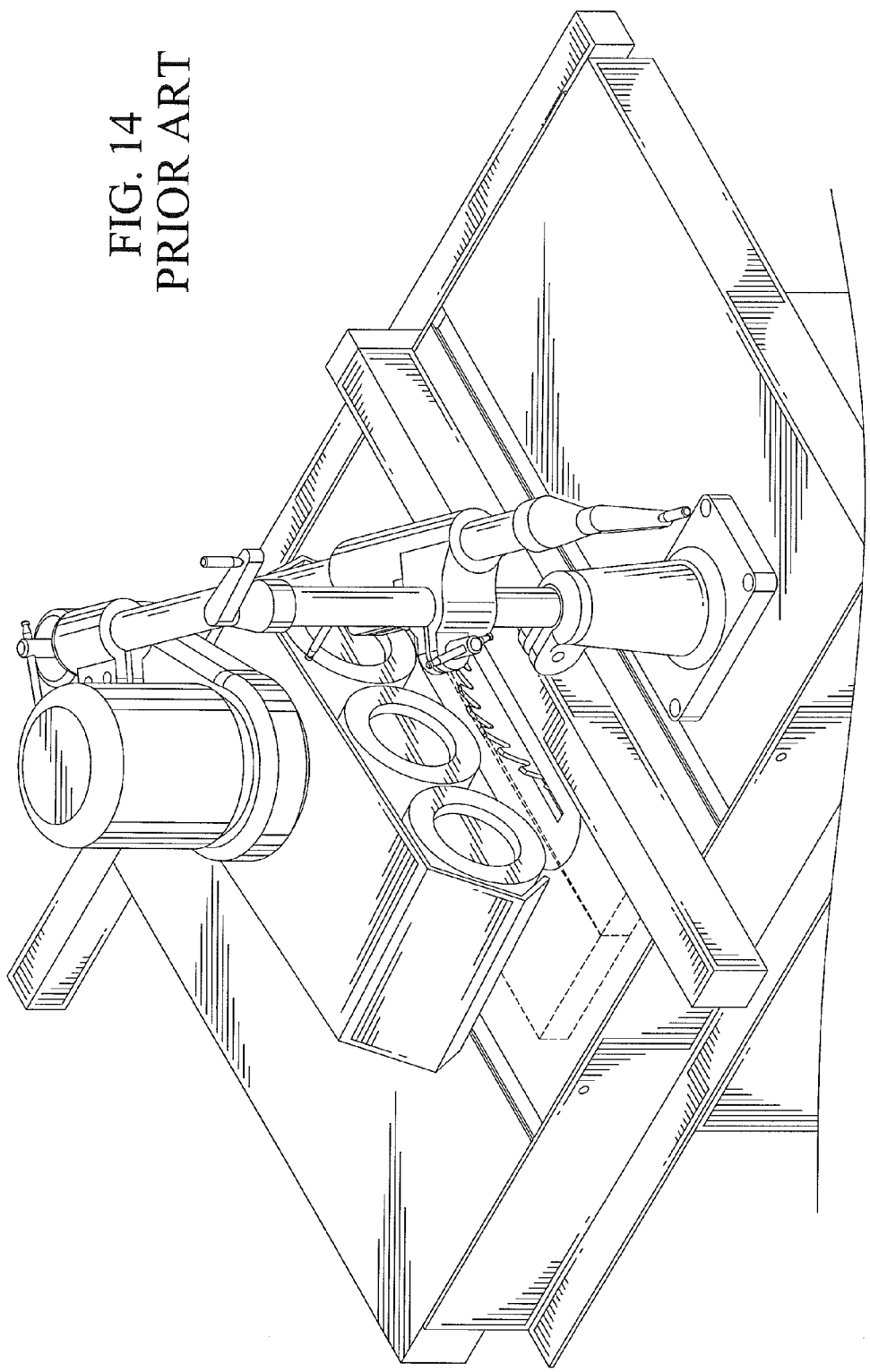
FIG. 14 is a perspective view of a conventional feeder and a woodworking machine, with the feeder feeding a wood workpiece to be processed by the woodworking machine.

FIGS. 11, 12, and 13 show each woodworking machine has a fence backing and allowing the wood workpiece to be fed accurately, with the fence defining a planar surface, and with the wood workpiece including a planar edge abutting against the planar surface of the fence. The safety feeder can move in a first orientation moving parallel to the planar surface of the fence, with the at least one first and the at least one second pressing rollers 23 and 24 moving in a path parallel to the planar surface of the fence. Therefore, the wood workpiece being fed by the safety feeder is under a force which parallel to the planar surface of the fence. The safety feeder can also move in a second orientation moving unparallel to the planar surface of the fence. The safety feeder moves unparallel to the planar surface of the fence will cause two force components, with a first force component parallel to the planar surface of the fence and a second force component perpendicular to the planar surface of the fence. It is appreciated that the second force component can help the wood workpiece align with the planar surface of the fence.

In view of the forgoing, the safety feeder is usable with different woodworking machines and allows a user to cut a wood workpiece safely and precisely in that the cutter of the woodworking machine can align between the adjacent two of the plurality of the first pressing rollers 23 and cut the wood workpiece between the adjacent two of the of the plurality of the first pressing rollers 23, with one half of the wood workpiece being pressed and pushed by one of the adjacent two first pressing rollers 23, and with the other half of the wood workpiece being pressed and pushed by the other of the adjacent two first pressing rollers 23, respectively. Likewise, the cutter of the woodworking machine can align between the adjacent two of the plurality of the second pressing rollers 24 and cut the wood workpiece between the adjacent two of the of the plurality of the second pressing rollers 24, with one half of the wood workpiece being pressed and pushed by one of the adjacent two second pressing rollers 24, and with the other half of the wood workpiece being pressed and pushed by the other of the adjacent two second pressing rollers 24, respectively. Furthermore, the adjacent two of the plurality of first pressing rollers 23 includes the gap of a size enough for cutters of other woodworking machines to be disposed therebetween.

The foregoing is merely illustrative of the principles of this invention and various modifications can be made by those skilled in the art without departing from the scope and spirit of the invention.

What is claimed is:

1. A safety feeder usable with different woodworking machines comprising:
    a fixing frame releasably mountable on a woodworking machine; and
    a device, connecting to the fixing frame, with fixing frame lifting the device, and including a drive system, a transmission system, and at least one first pressing roller and at least one second pressing roller, with the drive system engaging with and being able to drive the at least one first pressing roller and the at least one second pressing roller through the transmission system, with the transmission system including an axle engaging with the at least one first pressing roller and the at least one second pressing roller, and with the at least one first pressing roller and the at least one second pressing roller disposed separately in an axial direction with a predetermined gap on the driven axle;
    wherein each of the at least one first pressing roller and the at least one second pressing roller has a hub with a first side forming a recess and a second side opposite to the first side forming a protrusion,
    wherein the at least one first pressing roller includes a plurality of first pressing rollers engaging with the axle, wherein an adjacent two of the plurality of first pressing rollers have two arrangements,
        with the adjacent two of the plurality of first pressing rollers overlapping together without a gap and having circumferential edges combined and adjacent to each other in a first arrangement, and
        with the adjacent two of the plurality of first pressing rollers overlapping together with a gap and having the circumferential edges separated with the gap in a second arrangement.

2. The safety feeder as claimed in claim 1, wherein the transmission system includes a shaft interconnecting the drive system and the axle, with the shaft including a first bevel gear and the axle including a second bevel gear engaging with the first bevel gear.

3. The safety feeder as claimed in claim 2, wherein the shaft and the axle are arranged perpendicularly to each other.

4. The safety feeder as claimed in claim 2, wherein the at least one first and the at least one second pressing rollers are disposed on two different ends of the axle, and wherein the second bevel gear is in between the at least one first and the at least one second pressing rollers.

5. The safety feeder as claimed in claim 2 further comprising a sleeve receiving the shaft and the axle, with the sleeve including a first sleeve section delimiting a first area receiving the shaft and a second sleeve section delimiting a second area receiving the axle respectively, and with the first and second areas connected and in communication with each other.

6. The safety feeder as claimed in claim 1, wherein the fixing frame includes a plurality of beams telescopically connected with each other, wherein the fixing frame includes one of the plurality of beams securing to the woodworking machine,
    wherein the fixing frame includes another two of the plurality of beams telescopically connected with and movable relative to each other in a first direction that affects a vertical position of the device with respect to the woodworking machine,
    wherein the fixing frame includes another two of the plurality of beams telescopically connected with and movable relative to each other in a second direction that affects a horizontal position of the device with respect to the woodworking machine.

7. The safety feeder as claimed in claim 1, wherein the device is pivotally positionable with respect to the fixing frame, with the fixing frame and device including a pivot joint connecting therewith.

8. The safety feeder as claimed in claim 7, wherein the pivot joint includes a first pivot joint pivotally engaging with the fixing frame and a second pivot joint pivotally engaging with the device and includes the first and second pivot joints pivotally engaging with each other.

9. The safety feeder as claimed in claim 8, wherein the first pivot joint pivots with respect to the fixing frame in a first orientation, wherein the second pivot joint pivots with respect to the first pivot joint in the first orientation, wherein the device pivots with respect to the second pivot joint in a second orientation.

10. The safety feeder as claimed in claim 8, wherein the pivot joint includes first and second slots, a first locking member engaging with the first and second pivot joints by inserting the first locking member through the first slot, and a second locking member engaging with the second pivot joint and the device by inserting the second locking member through the second slot, wherein the first locking member has a lock position in which the first and second pivot joints are at a fixed relative pivoting position and an unlock position in which the first and second pivot joints are pivotal relative to each other, and wherein the second locking member has a lock position in which the second pivot joint and the device are at a fixed relative position and an unlock position in which the second pivot joint and the device are pivotal relative to each other.

11. The safety feeder as claimed in claim 10, wherein the first and second slots define two arcuate slots.

12. The safety feeder as claimed in claim 10, wherein the pivot joint has two scales, with one scale indicating a pivoting position of the second pivot joint with respect to the first pivot joint, and with the other scale indicating a pivoting position of the device with respect to the second pivot joint.

13. The safety feeder as claimed in claim 7, wherein the device includes a body shell that frames the at least one first pressing roller and the at least one second pressing roller, and wherein the body shell and the pivot joint pivotally engage with each other.

14. The safety feeder as claimed in claim 13, wherein the body shell includes a groove extending therethrough, and wherein a suspension system interconnects the body shell and the axle, with the suspension system including a strut, a biasing member, and a retainer, with the strut having a first end pivotally connecting to the axle and a second end inserting through the groove, with the retainer connecting to the second end of the strut and supported by the body shell, with the retainer slidable on the body shell, with the biasing member restrained on the strut, with the biasing member disposed between the body shell and the axle.

15. The safety feeder as claimed in claim 14 further comprising a constrainer constraining the transmission system and the suspension system, with the constrainer connecting to the transmission system and the body shell, and wherein the constrainer pivotally engages with the body shell.

16. The safety feeder as claimed in claim 1, wherein the two adjacent of the plurality of first pressing rollers in the second arrangement include the protrusions facing oppositely and abutting against each other.

17. The safety feeder as claimed in claim 1, wherein the two adjacent of the plurality of first pressing rollers in the second arrangement include a spacer disposed therebetween, and wherein the spacer engages with the axle.

18. The safety feeder as claimed in claim 17, wherein the two adjacent of the plurality of first pressing rollers in the second arrangement include the protrusions facing in the same direction.

19. The safety feeder as claimed in claim 17, wherein the two adjacent of the plurality of first pressing rollers in the second arrangement include the protrusions facing oppositely.

* * * * *